Jan. 5, 1960 R. R. CANDOR 2,919,493
CONTROL MEANS FOR WASHER-DRYER
Filed July 23, 1954 3 Sheets-Sheet 1

INVENTOR.
Robert R. Candor
BY
R R Candor
Attorney

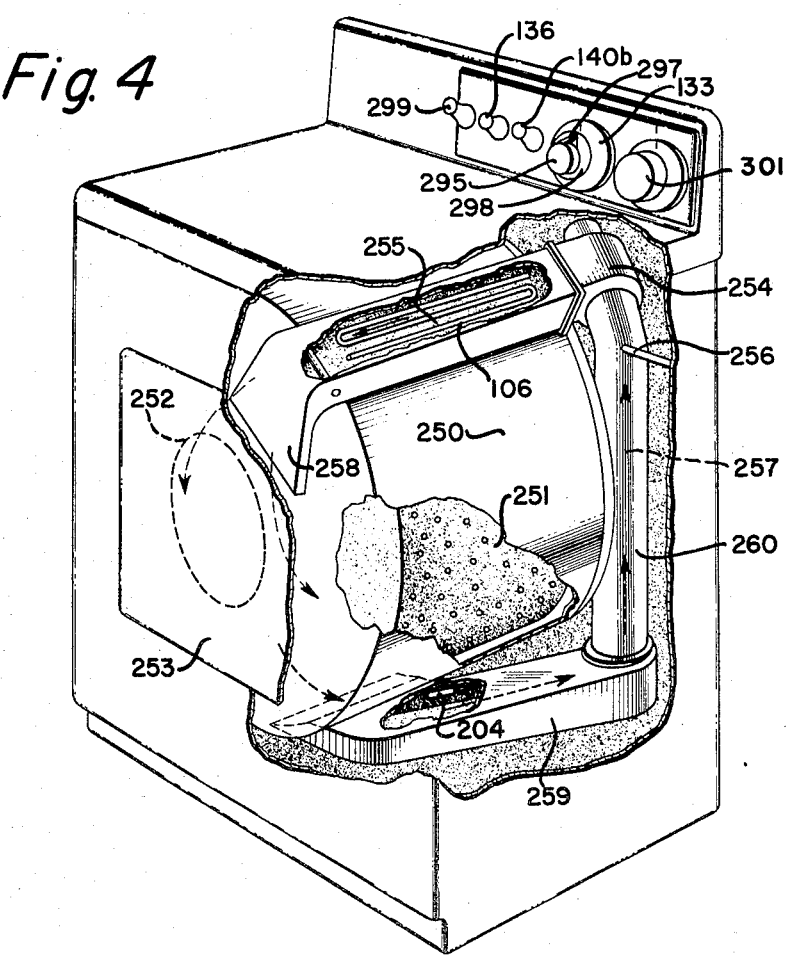

United States Patent Office 2,919,493
Patented Jan. 5, 1960

2,919,493
CONTROL MEANS FOR WASHER-DRYER

Robert R. Candor, Dayton, Ohio, assignor to General Motors Corporation, Detroit, Mich., a corporation of Delaware Application July 23, 1954, Serial No. 445,361

1 Claim. (Cl. 34—48)

This invention relates to domestic appliances and more particularly to a controller for a clothes washer-dryer.

An object of this invention is to provide a combined clothes washer-dryer with a sequence controller which automatically causes the washer-dryer to go through the complete washing cycle and the drying cycle sequences and thereafter automatically stops when the clothes have dried, and before the controller reaches the predetermined timed stop position, and which is provided with a combined heater and automatic stop adjuster.

Another object of this invention is to provide a combined clothes washer-dryer with control means to permit selection of a combined washing and drying cycle, a washing cycle alone, or a drying cycle alone, and in which the heating input during the drying cycle may be modified to suit various clothes loads.

Further objects and advantages of the present invention will be apparent from the following description, reference being had to the accompanying drawings wherein a preferred form of the invention is clearly shown.

In the drawings:

Figure 4 is a perspective of another representative type of washer-dryer which may be controlled by my controller.

This invention is directed to a timer-controller which selectively causes any combined washer-dryer to complete a combined washing and drying cycle, a washing cycle alone, or a drying cycle alone. The heating input during the drying cycle is adjustable. Also, the washer-dryer and the timer are automatically stopped when the clothes reach a dry condition even if the timer has not reached the timed "stop" position, and this automatic stop is reset by further rotation of the timer knob. A single knob may be provided for adjusting the heat input and the automatic dryness stop.

Figure 3:
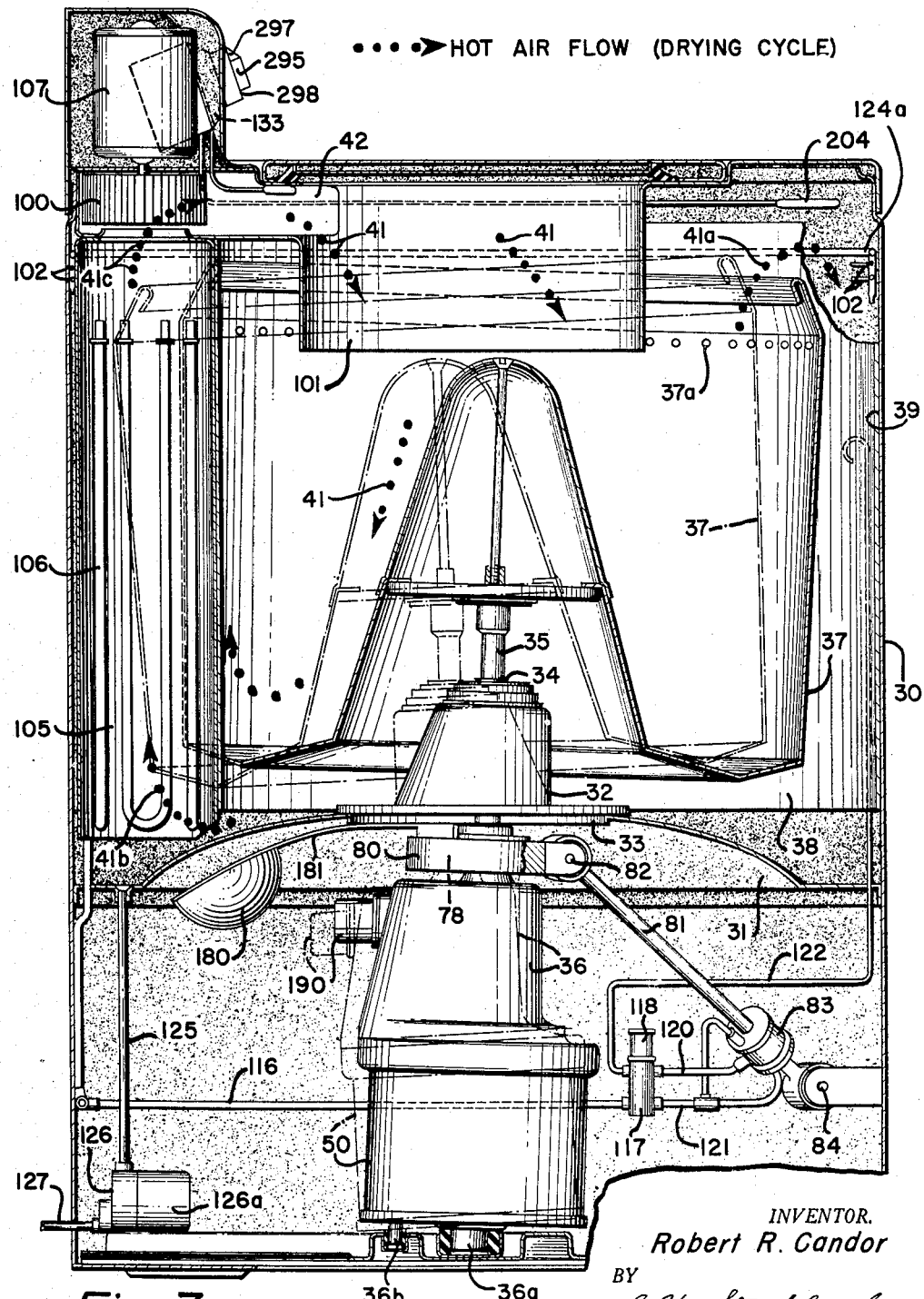
Figure 3 is a vertical cross-section of a representative combined clothes washer and dryer which may be controlled by my improved controller.

In order more fully to describe the invention, washer-dryers are specifically disclosed in Figures 3 and 4 and descriptions of such washers are made herein only to the extent necessary to understand the present invention.

The washer-dryer construction of Figure 3

Figure 1:
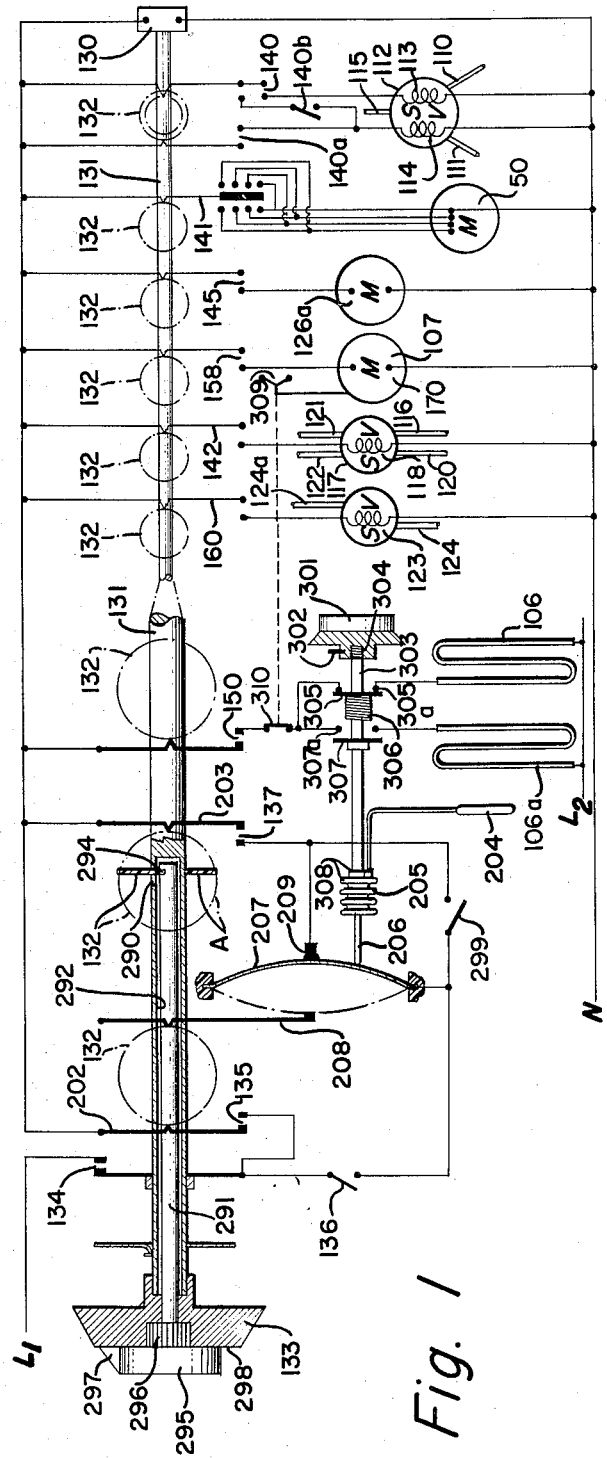
Figure 1 is a diagram of a control system for the washer-dryer shown in Figure 3, and using my improved controller.
Figure 2:
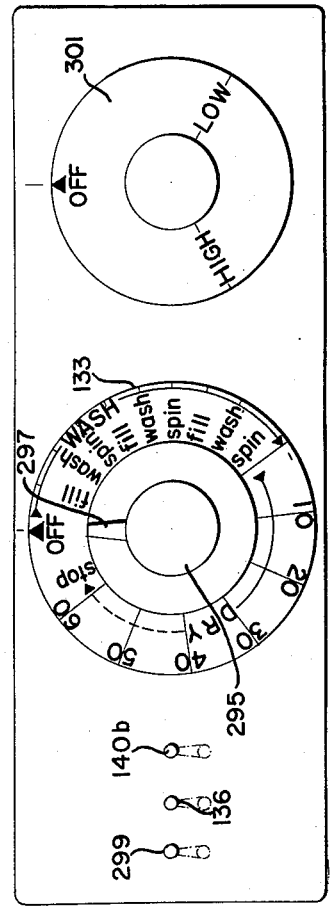
Figure 2 is an elevation of a panel which receives my improved controller.

The washer-dryer shown in Figure 3, and some of the elements of said washer-dryer, which are diagrammatically indicated in Figures 1 and 2 are more fully described in the application of Byron L. Brucken, for Domestic Appliances, S.N. 439,989, filed June 29, 1954, and to which reference is made for a more detailed description of such washer-dryer. Certain features of the controller herein disclosed are also disclosed in my copending application for Domestic Appliances, S.N. 440,047 filed June 29, 1954, to which reference is made, if necessary, for further disclosure. Reference is also made to my copending application S.N. 365,759, filed July 2, 1953 for Domestic Appliances, now Patent No. 2,782,622. The elements in this application, which are designated by numbers below "200" (with obvious exceptions) operate substantially the same as in the Brucken application, and are numbered in said application with identical numbers. Elements which are indicated by numbers above "200" and below "300," in the instant application, are elements which are substantially the same as in my copending application S.N. 440,047. Exceptions sometimes occur where a suffix "a" or the like has been added, when such element may have a new feature.

Briefly to summarize the disclosure corresponding to the Brucken application, Figure 3 of this application discloses an automatic clothes washing and drying machine in which 30 is a cabinet, 31 a bulkhead across the cabinet, 32 is a cone-shaped flexible support which closes the opening 33 in the bulkhead 31 and supports the tub and driving mechanism. Numeral 34 is a water seal to prevent water above the bulkhead 31 from flowing down along the drive shaft 35 between the power unit 36 and the tub 37 provided with centrifugal discharge openings 37a.

Numeral 38 is a cylindrical casing which touches the cabinet 30 tangentially at four places 39, since the cabinet 30 has a square-shaped horizontal cross-section. Numeral 41 indicates heated air which is blown into the tub 37 to dry the clothes. This heated air flows over the rim of the tub and downwardly along the four corners of the cabinet between the cylindrical casing 38 and the cabinet 30, as indicated by the arrows 41a. While flowing downwardly, the air 41a is cooled by a cold water spray coming from the spray head system 102. The water vapor which was previously absorbed from the clothes is condensed by the cold water spray. The cold and dried air flows along 41b through the heating compartment 105, where the air is heated by the electric heater 106 (and the heater 106a, added in this application) and flows, as indicated at 41c, to the fan 100, driven by motor 107. The fan blows the heated air through the nozzle 42 into the downwardly directed cylindrical drum 101, to be recirculated again against the clothes which are being tumbled within the tub 37. The heaters 106 and 106a form a composite heater having an adjustable heat input.

The power unit 36 is provided with a motor 50 within the power unit 36. The unit or casing 36 has a cylindrical extension 36a resting within a resilient support and is also provided with a pin 36b also resting within a resilient support. The tub 37 and power unit 36 gyrate about the extension 36a, and the power casing 36 is prevented from rotating about the extension 36a by the pin 36b.

Numeral 78 designates an eccentric surrounded by a collar 80 which causes the tub 37 to gyrate when the collar 80 is firmly held by the rods 81 through the action of bearings 82 and 84 and holding means 83. The holding means 83 has a hydraulic construction such that when water is fed through the pipe 121, the collar 80 is held stationary, whereas when water is fed under pressure through the pipe 120, the collar 80 is released for loose travel with the tub when it is spun at high speed. The valve 117 is actuated by the solenoid 118 and selectively introduces water under pressure either into pipe 120 or pipe 121, and simultaneously the unselected pipe empties water from the holding means 83, which water is discharged through the pipe 122 into the space above the bulkhead 31.

Hot or mixed water is introduced into the tub 37 from the hot water pipe 110 (shown in Figure 1) and cold water pipe 111 through the control valve 112 which discharges the selected water into the pipe 115 and from thence in the usual manner into the tub 37 through a well known nozzle not herein disclosed but shown and described in the Brucken application. Hot water controlling solenoid 113 and cold water controlling solenoid 114 are energized at suitable intervals to introduce the desired water into the tub. The valve 112 has a suitable construction to distribute water at a constant volume, properly to fill the tub. A selector switch 140b determines whether the first fill of the tub is hot water, when switch 140b is open, or is tepid water, if the manual switch 140b is closed.

Cold water for the condenser spray construction 102 is supplied from the cold water pipe 111 to the pipe 124 thence through the condenser valve 123 which is solenoid operated and then flows through pipe 124a to the condenser nozzle construction 102 to deliver cold water for condensing the water vapor out of the air.

Pipe 125 receives all of the water which is discharged from the condenser, tub and holding means 83 into the space above the bulkhead 31, and the pipe 125 delivers this water to the pump 126, driven by motor 126a and which discharges the same under pressure through the pipe 127 to a drain, stationary tub or the like.

A counterweight 180 is attached by an arm 181 to the eccentric 78 to counterbalance the gyrating action of the tub, as more fully described in the Brucken application.

The motor 50 has a rotor shaft, not shown in this application, but shown in the Brucken application. When the rotor shaft rotates clockwise, the tub shaft 35 is rotated clockwise at high speed, such as 1140 r.p.m. to wring the clothes centrifugally in the outwardly flared tub 37, from which the water is discharged through openings 37a into the space inside the cylindrical sleeve 38 from whence it flows into the pipe 125. When the motor rotor shaft is rotated counterclockwise, the tub shaft 35 and the tub 37 are gyrated counterclockwise, while the shaft 35 is rotated slowly clockwise to produce clothes agitation during the washing operation and clothes fluffing during the drying operation. The gyration is at the rate of 300 r.p.m., while the slow rotation is at the rate of 60 r.p.m. The solenoid 190 is used to lock the gyrating gearing during the spin operation to prevent any idling gyrating movement during the spin operation.

The foregoing description, together with the more detailed disclosure in the Brucken application, shows that a tub 37 is filled with wash water and detergent and simultaneously gyrated and slowly rotated to produce an initial washing action on the clothes. Thereafter, the tub is spun at high speed centrifugally to wring the clothes. The tub then is filled again with water without detergent, gyrated and slowly rotated to rinse the clothes and thereafter again spun at high speed centrifugally to wring the clothes, and this rinsing operation can be repeated a second time if desired. Thereafter, a drying operation is performed by blowing heated air through the nozzle 42, as indicated at 41, while the tub is being gyrated and slowly rotated, to cause the hot dry air 41 to absorb the moisture from the clothes. This moisture-laden warm air flows over the rim of the tub and over the rim of cylindrical casing 38, as indicated at 41a and then downwardly at the corners of the cabinet 30, where the air is cooled by cold water spray from nozzle construction 102 to condense the water vapor from the air. The cooled dried air flows, as indicated at 41b, through the heating chamber 105, where it is heated by the heaters 106 and 106a and enters the fan 100 as indicated at 41c where it is again blown through the nozzle 42 for recirculation in contact with the clothes.

*The controller, Figures 1 and 2*

When the user closes the manual switch 136, and manual switch 299, the washing machine will go through both the washing cycle and the drying cycle, if the knob 133 is pushed in and placed at the start position to close contacts 134. The machine will not stop until the complete time cycle of the timer is completed to the timer "off" position, even if the clothes are dried a long time before the timer reaches such "off" position. The user can cause a washing cycle to be performed, without the drying cycle, by opening the manual switch 136, whereupon the machine will start when the knob 133 is moved to the start position and pushed in and the machine will go through the washing cycle while the contacts 135 are maintained in closed position by the washing control cam 132, which actuates the washing control blade 202. At the end of the washing cycle, the blade 202 opens the contacts 135, whereupon the timer motor 130 is stopped together with the timer shaft 131 in such a position that all of the cams 132 leave the machine in the completed washing cycle condition. A drying cycle can be performed without a previous washing cycle by closing the switch 136, and rotating knob 133 to the start of the drying cycle whereupon the drying control cam 132, which actuates the drying control blade 203, closes the contacts 137 and the drying cycle is started and continues until it is stopped. Such drying cycle continues until the off position of the dial is reached, unless further features herein disclosed are used. However, if such features are used, by opening switch 299, the drying operation with or without a previous wash cycle is automatically stopped before the timer reaches the stop position as soon as the clothes reach a dry condition. This is accomplished by the thermostatic bulb or humidistatic device 204 when it becomes responsive to a dry condition of the clothes. The bellows or humidistat 205 moves the pusher 206 to the left, in Figure 1, whereupon the snap switch 207 is snapped to the left, as indicated by the most leftward dotted position against a flexible, non-electrical blade 208. When the switch 207 is so moved, the contacts 209 are opened and the circuit to the timer motor 130 is opened, whereupon the timer and the washer-dryer stop in response to the dryness of the clothes.

When the bulb 204 is thermostatic, it becomes responsive to the dry condition of the clothes when the air 41a, as it leaves the clothes, rises abruptly in temperature above 160° F. to approximately 200° F. The air 41a remains below about 150° F. throughout the drying cycle, and hence the switch 207 is opened automatically by a thermostatic action only when the clothes reach a satisfactory dry condition, and before the timer has reached the "off" position.

If the device 204, 205 is humidistatic, the humidity conditions of the air 41a vary abruptly when the clothes have reached a substantially dry condition and such device 204, 205 becomes automatically responsive to this change and moves the switch 207 in the same manner, so that the timer and washer-dryer are stopped automatically in response to humidity conditions of the air 41a as soon as the clothes are dry.

Some of the circuits shown in Figure 1 may be briefly described as follows. The various cams 132 operate the various blades to open or close the corresponding contacts. To fill the tub with hot water after the clothes and detergent have been placed in the tub 37, the contacts 140 are closed to energize solenoid 113 and introduce hot water into the tub for the correct length of time to fill the tub properly. If tepid water is desired in this first fill, the switch 140b is closed whereupon the cold water controlling solenoid 114 is also energized to cause mixed water to be introduced. After the tub is filled, the blade 141 moves to energize the motor 50 to cause simultaneous gyration and slow rotation of the tub 37 for the proper length of time. Simultaneously, the contacts 142 are closed to cause water under pressure to be delivered to the pipe 121 and holding means 83 to hold the collar 80 in a fixed position to cause gyration. After a suitable length of time, contacts 142 are opened to release collar 80 and blade 141 moves to cause the motor 50 to spin the tub 37 at high speed centrifugally to wring the clothes. Simultaneously, the contacts 145 are closed to cause the motor 126a to drive the pump 126 from that time on until the termination of the washing and/or drying operation. The filling, gyrating—slow rotating, and spin operations are repeated one or two more times to produce one or two rinsing operations and to complete the washing cycle. Thereafter, if the manual switch 136 is closed, the drying cycle starts by the movement of blade 141 to produce gyration and slow rotation of the tub while contacts 150 and 158 are simultaneously closed to energize the heaters 106 and 106a, blower motor 107 and the pump motor 126a.

The drying operation continues until the timer reaches the timer drying cycle off position, unless the automatic dryness stop is used. If the dryness stop is included in the timer, the washer-dryer and the timer are stopped as soon as the clothes reach a dry condition even if the timer has not reached the drying cycle off position. This is accomplished, as previously described, by the action of the thermostat or humidistat 204, 205, which opens the snap switch 207 as soon as the clothes reach a dry condition and thus opens the circuit to the timer motor 130 and to all of the elements of the washer-dryer, so that the entire apparatus is placed in a non-operating condition until the timer knob 133 is moved to a position beyond the position it was stopped by the thermostat or humidistat 204, 205. This is accomplished by the blade 208 which is moved to the right by proper camming construction of its cam 132. This cam is so constructed that it moves blade 208 just as knob 133 reaches the drying cycle stop position or at any point beyond such stop position. This resetting of switch 207 can take place at the wash start position or at any time after and up to and including the starting of the drying cycle, as this cam urges blade 207 to the right in all knob positions except after the drying cycle start and up to just before the drying cycle stop position.

The blade 208 is made flexible but strong enough to move the switch 207 to the right as long as it is not opposed by the pusher 206. If the thermostat or humidistat has not returned to normal to move pusher 206 completely to its normal complete right position, then the blade 208 pushes switch 207 as far as the pusher 206 permits. Upon further cooling of thermostat 204 to normal the blade 208 pushes switch completely to the closed position indicated by the full lines.

The washer-dryer illustrated in Figures 1, 2 and 3 has been of the specific type disclosed in Figure 3, but it is to be understood that the improved controller may be used with any type of washer-dryer. To illustrate, Figure 4 is a perspective of any suitable washer-dryer. For example, a stationary drum 250 contains a rotatable perforated drum 251 into which the clothes are placed through the opening 252 behind the door 253. For the washing cycle, detergent is placed within the drums 250 and 251, and water is introduced under proper control of the timer to the proper level, whereupon the drum 251 is slowly rotated to produce an agitating washing action. Thereafter, the water outlet from the drum 250 is opened to drain the water from the drum 250 and the drum 251 is rotated at high speed centrifugally to wring the clothes in the drum 251. Thereafter, one or more clear water rinses are performed in the same manner, including slow rotation agitation, and high speed centrifugal spinning, to thoroughly rinse the clothes. After the final spin, the blower 254, and the heater 255 are energized together with a cold water, vapor condensing spray 256. This causes a circulation of air indicated by the arrows 257 which enters the drums 250 and 251 in a hot dry condition at the nozzle 258, passes through the drums to absorb moisture from the clothes, then passes through the passageway 259 to the bottom of the condensing cylinder 260, where the warm moist air comes in contact with the cold water spray to condense the vapor from the air, after which the cold dry air enters the blower 254 to be recirculated past the heaters 255 and back into the drums.

The adjustable dryer stop

Figure 1 shows a further feature which permits the user to adjust the drying cycle stop position of the timer. Also, if desired, the user can neutralize the automatic thermostatic or humidistatic stop which is responsive to the dryness of the clothes. This enables the user to cause the drying cycle to stop at some preselected period of time, which is adjustable. For example, should the user wish to insure that a load of clothes is not dried completely but remains damp, as for ironing purposes, then the user would neutralize the automatic dryness stop, and would shorten the timed drying cycle, in accordance with features disclosed in Figure 1 and now described.

The drying cycle cam 132, which is also indicated by the letter "A," is rotationally adjustable on the shaft 131, to adjust the timed stopping time of the blade 203. To this end an arc shaped slot 290 is made in the shaft 131. An inner shaft 291 is placed within the shaft 131, and passes through the hollow portion 292 of the shaft 131. The shaft 291 has the cam "A" secured thereto by a tongue 294 which enters the slot 290, and causes the cam "A" to be rotationally adjusted by the turning of the inner shaft 291. An adjusting button 295, on the knob 133, is secured to the shaft 291 and has an adjustable splined engagement at 296 with the main body of the knob 133. The button 295 may be temporarily pulled outward from the knob 133, and the shaft 291 rotated to adjust the cam "A" to the various drying time stopping positions indicated on Figure 2. The pointer 297 on the button 295 indicates the drying time selected, which is marked on the knob 133. After the desired drying time has been selected, the button 295 is moved back to effect the splined engagement 296 to lock the shaft 291 relatively to the shaft 131.

Should the user desire to by-pass the automatic dryness stopping switch 207, the manual switch 299 is closed, and this shunts the switch 207, and the current can pass to the contacts 137 independently of the switch 207.

By this construction, the user can shorten the timed stop position on the timer by rotationally adjusting the button 295 on the knob 133 for a different preselected stopping position. This is, in effect, a user's adjustment of the timed stop position of the timer.

If the user leaves switch 299 in an open position, then the automatic dryness controller 204, 205, 207 may stop the timer and washer-dryer before the timer reaches the shortened and adjusted stop position, should the clothes become dry before such stop position is reached by the timer. On the other hand, if the switch 299 is closed, then the drying cycle will be exactly the timed cycle which is selected by the position of button 295, and the dryness controller 207 becomes ineffective to stop either the timer or the washer-dryer.

The heater adjustment

Means are provided simultaneously to adjust the heater input and the automatic dryness stop by a single knob. To this end the knob 301 is rotationally free, but longitudinally locked, by the fixed pin 302 riding in a groove in the neck of the knob. The knob 301 has a threaded engagement with the rotationally fixed but longitudinally movable shaft 303 at 304. Rotation of the knob 301 moves the shaft 303 longitudinally. A contact 305 is pressed rightward by a spring 306 which has one end secured to the shaft 303. When the knob 301 is rotated to the "low" position, the contact 305 closes upon its stationary contacts 305a and energizes the heater 106 when the contacts 150 are closed by the timer. A second contact 307 is closed upon its stationary contacts 307a upon the further rotation of knob 301 to the "high" position and this energizes the heater 106a, thus to modify or increase the heat input for the drying operation. If desired, further serially closeable contacts and heaters may be added, or any other equivalent construction may be used, to modify the heat input of a single heater or a plurality of heaters. The shaft 303 also axially adjusts the bellows 205, to move it rightward as the knob is rotated from the off position through the low and high positions. The shaft 303 has a fixed engagement with the bellows 205 at the point 308. Under these conditions, when more heat is being applied by the use of the two heaters 106 and 106a, the automatic dryness stop has been correspondingly adjusted, since the bellows 205 has been moved rightward. Therefore the bulb 204 must be heated to a higher temperature in order to snap the switch 207 to the open position. This compensates for the increased heat input at the "high" position of knob 301, so that the switch 207 will not be opened prematurely due to the extra heat being added at the "high" position.

A safety control may be used to prevent the energization of the heaters 106 and 106a should the blower motor 107 fail to rotate. This is accomplished by providing a centrifugal switch 309, 310 which automatically opens when the motor 107 is stationary but closes when the motor 107 rotates at normal operating speed. This insures that the heaters will not be energized unless the blower motor 107 is rotating normally, and hence there is no danger of overheating the machine due to a stalled blower motor.

Some of the features herein disclosed may be used with or without other disclosed features. For example, the adjustment of the heat input may be used with or without the dryness stop. If it is desired to maintain a low cost of the machine, the automatic dryness stop 205, 209 can be omitted, and the heater adjustment may be retained, or vice versa. When the heater adjacent is used alone, the drying operation will continue until the timer has reached its off position, notwithstanding that the clothes may have dried a long time before the stop position is reached. However, when the heater input has been adjusted to the low position for delicate clothes, there is no danger of overheating such clothes, even if they should remain in the dryer for the entire drying period of time while being mildly heated by such low position adjustment. The high position adjustment preferably is calibrated, so that a heavy clothes load has reached substantially its dry condition when the timer reaches its stop position. As heretofore stated, the adjustment of the heaters may include more than the two positions specifically disclosed, and any number of intermediate positions may be added by the use of additional heaters and switches or by any other well-known method of adjusting heater input, to provide heat adjustment for a large variety of clothes loads.

*The washer-dryer of Figure 4*

The wiring diagram of Figure 1 can also be considered representative of the application of this controller to any washer-dryer, such as shown in Figure 4. The two cams previously described with respect to Figure 3, which operate the blades 202, 203 and 208, together with the snap switch 207 which is operated by the thermostat or humidistat 204, 205 and the heater adjuster 301, etc. operate similarly when applied to Figure 4. It is deemed unnecessary to describe the electric circuits which operate the other elements of the machine of Figure 4, since such circuits are individual to the particular washer-dryer which is being controlled, but it is obvious that the timer shaft 131, operated by the timer motor 130, can operate any number of cams and blades necessary to properly control such a washer-dryer. The timer construction operates with respect to Figure 4 in the same manner as previously described with respect to Figure 3 in such a manner that the user can select whether the washer-dryer will perform a combined washing and drying operation, a washing operation alone, or a drying operation alone. Whatever operation is selected by the user, the machine is automatically stopped either at the end of the washing cycle, if no drying is desired, or as soon as the clothes are dry if a combined washing and drying operation or a drying operation alone are selected, this latter stopping of the machine occurring even before the timer reaches the off position of the drying cycle, if the clothes reach a dry condition prior thereto. The heater adjustment is also used as to Figure 4.

While the embodiment of the present invention as herein disclosed constitutes a preferred form, it is to be understood that other forms might be adopted.

What is claimed is as follows:

A laundry dryer including a clothes container, a plurality of heaters for heating the clothes in said container for drying the clothes, a timing means for controlling said heaters, a dryness responsive means having an actuating portion responsive to a predetermined physical condition of the air in said container for controlling said heaters, adjustment means for said dryness responsive means, said adjustment means having a first set of contacts connected to one of said heaters, a second set of contacts connected to another of said heaters, a first bridging member for said first set of contacts, a second bridging member for said second set of contacts, and a shaft for mounting said bridging members and movable axially to engage said bridging members with their respective sets of contacts for selectively energizing said heaters, said shaft having an integral segment for mounting said actuating portion of said dryness responsive means, whereby said axial movement of said shaft and said bridging members for selectively energizing said heaters simultaneously adjusts the dryness responsive means for varying the point at which the heating of said selectively energized heaters is terminated, and means for selecting either said timing means or said dryness responsive means independently for controlling the drying of said clothes.

References Cited in the file of this patent

UNITED STATES PATENTS

| | | |
|---|---|---|
| 2,328,256 | Breckenridge | Aug. 31, 1943 |
| 2,486,315 | Morris | Oct. 25, 1949 |
| 2,505,041 | Gorsuch | Apr. 25, 1950 |
| 2,550,118 | Kauffman | Apr. 24, 1951 |
| 2,553,581 | Hatfield | May 22, 1951 |
| 2,555,268 | Chamberlin | May 29, 1951 |
| 2,607,209 | Constantine | Aug. 19, 1952 |
| 2,624,352 | Illian | Jan. 6, 1953 |
| 2,769,246 | Shapter | Nov. 6, 1956 |